No. 639,416. Patented Dec. 19, 1899.
J. LYKER.
CAR BRAKE.
(Application filed Oct. 7, 1899.)
(No Model.)
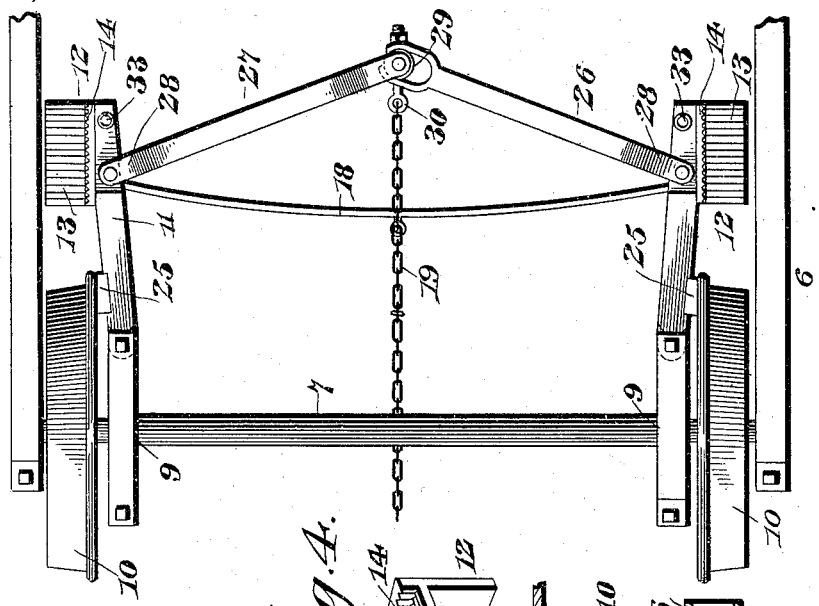
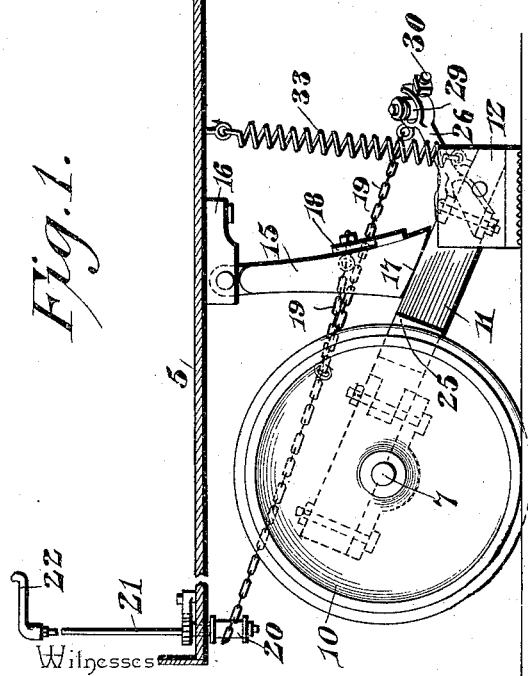
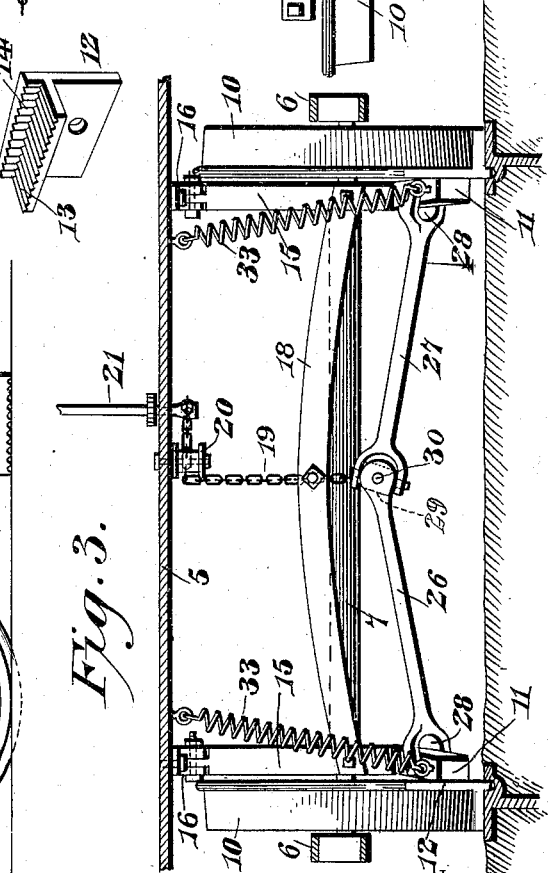
Witnesses
Jas. K. McCathran
Geo. H. Chandlee
Inventor
John Lyker
By his Attorneys,
C. A. Snow & Co.

UNITED STATES PATENT OFFICE.

JOHN LYKER, OF ROOT, NEW YORK.

CAR-BRAKE.

SPECIFICATION forming part of Letters Patent No. 639,416, dated December 19, 1899.

Application filed October 7, 1899. Serial No. 732,916. (No model.)

*To all whom it may concern:*

Be it known that I, JOHN LYKER, a citizen of the United States, residing at the town of Root, in the county of Montgomery and State of New York, have invented a new and useful Car-Brake, of which the following is a specification.

This invention relates to car-brakes, and more particularly to that class known as "hand-operated;" and it has for its object to provide a combination and arrangement of brake-shoes which will simultaneously engage the wheels of a vehicle and also the track, the arrangement being such that the track-shoes are wedged into place and the wheel-shoes impinge the inner faces of the wheel instead of the treads, as is usual.

In the drawings forming a portion of this specification, and in which similar numerals of reference designate corresponding parts in the several views, Figure 1 is a side elevation showing the application of the brake mechanism at one end of the car. Fig. 2 is a bottom plan view of a portion of a truck carrying a pair of wheels and having the brake mechanism connected therewith. Fig. 3 is a rear elevation of Fig. 1 with the truck sides in place. Fig. 4 is a detail perspective of a track brake-shoe.

Referring now to the drawings, 5 represents the platform of a car, to which is connected in the usual manner a truck comprising sides 6, having a wheel-axle 7 journaled at its ends in said sides. The central portion of the axle 7 is enlarged, as shown, and results in the formation of shoulders 9, between which and the wheels 10, which are mounted upon the reduced portions, are arranged brake-levers 11, having journal-boxes, (shown in dotted lines in Fig. 1,) in which the axle 7 turns. These brake-levers 11 extend rearwardly and downwardly and have track brake-shoes 12 pivoted to their rear ends and adapted for engagement with the track, each of these shoes comprising a horizontal corrugated friction-surface 13 and a similar vertical surface 14, of which the surface 14 is adapted for engagement with the inner surface of the rail-tread to prevent displacement of the surface 13 outwardly and also to increase the braking action.

The brake-levers 11 are adapted for depression into operative position by means of wedge-blocks 15, which are pivotally connected to hangers 16 upon the under side of the platform 5, and which wedge-blocks have arc-shaped lower ends 17, adapted for engagment with the upper surfaces of the brake-levers 11. The blocks 15 are connected by means of a transverse beam 18, to which is attached a chain 19, leading to a drum 20 upon a brake-shaft 21, journaled in the platform 5 in the usual manner and having an operating-crank 22. Thus by winding the chain 19 upon the drum 20 the blocks 15 will be drawn with their lower ends 17 in slidable contact with the levers 11 and will act to depress the latter and force the surfaces 13 against the treads of the rails to stop the car. Each of the levers 11 has a second brake-shoe 25 fixed thereto upon its outer face and in a position to engage the inner face of the adjacent wheel 10 when its respective lever 11 is moved with its lower end outwardly upon the axle 7 as a fulcrum, the bearings of the levers 11 being sufficiently loose to permit this movement.

In order to move the rear ends of the levers 11 outwardly to engage the shoes 25 with the wheels 10, a toggle-lever has its links 26 and 27 pivotally connected with the rear ends of the levers 11 through the medium of bifurcations 28, between which the levers are received and to which they are pivoted. In order to connect the links 26 and 27, the inner end of the link 26 is bifurcated and has a block 29, rotatably mounted between the bifurcations. Diametrically of the block 29 is passed an eye-bolt 30, which also passes through slots formed in the bifurcations of the inner end of the element 27, and which bifurcations are disposed to inclose the block 29. A branch of the chain 19 is connected with the eye of the bolt 30, and thus may the toggle-lever and wedge-blocks be operated simultaneously.

From the above description it will be seen that when the crank 22 is operated the chain 19 will be wound upon the drum 20, at which time the wedge-blocks 15 will force the shoes 12 into engagement with the track, and simultaneously therewith the toggle-lever will move the levers 11 outwardly at their lower ends and will force the shoes 25 against the inner faces of the wheels 10, bringing both sets of shoes into operative position at the same time. In order to hold the shoes normally retracted, springs 33 are fixed to the rear ends of the levers 11 and to suitable points upon the platform 5 at its under side. The wedge-blocks 15 are of such proportions that they never lie upon their dead-centers, and the ends of them have such curvature that the pull of the springs 33 will force them backwardly when released by the chain 19. Also the links 26 and 27 never reach a straight line, and the springs 33 being disposed inwardly, as shown in Fig. 3, the shoes 25 are quickly moved from the wheels 10.

It will of course be understood that in practice the specific construction and arrangement shown may be altered and that any desired materials and proportions may be used without departing from the spirit of the invention.

What is claimed is—

1. In a brake mechanism, the combination with brake-levers having shoes upon their outer faces and additional shoes at their lower ends, of means for simultaneously moving the levers outwardly and downwardly to operate the shoes.

2. The combination with an axle and wheels thereof, of brake-levers fulcrumed upon the axle, shoes upon the outer faces of the lever adapted for engagement with the inner faces of the wheel, shoes upon the ends of the levers adapted for engagement with the track, and means for moving said levers with their shoes simultaneously outwardly and downwardly to operate the shoes.

3. The combination with a car and the wheels thereof, of brake-levers having shoes adapted for engagement with the wheels, additional shoes upon the levers adapted for engagement with the track, wedge-blocks adapted to move the levers to operate the track-shoes, a toggle-lever arranged between and connected with the brake-levers to move them outwardly and engage the wheel-shoes with the wheels, and means for operating the blocks and toggle-levers.

4. The combination with a car and the wheels thereof, of brake-levers having shoes adapted for engagement with the wheels, additional shoes upon the levers adapted for engagement with the track, wedge-blocks adapted to move the levers to operate the track-shoes, a toggle-lever arranged between and connected with the brake-levers to move them outwardly and engage the wheel-shoes with the wheels, and a common means for operating the blocks and toggle-lever simultaneously.

5. The combination with a car and the wheels thereof having an axle, of brake-levers fulcrumed upon the axle, shoes upon the levers adapted for engagement with the wheels, additional shoes pivoted to the levers and having friction-faces adapted for engagement with the top and the side of each rail respectively, wedge-blocks pivoted to the car and adapted for engagement with the levers to move the track-shoes against the upper surfaces of the rails, a toggle-lever between and connected with the brake-levers and adapted to move the wheel-shoes against the wheels and the track-shoes against the sides of the rails, means connected with the brake-levers for returning the levers and wedge-blocks, and means connected with the wedge-blocks and toggle-lever for operating them.

In testimony that I claim the foregoing as my own I have hereto affixed my signature in the presence of two witnesses.

JOHN LYKER.

Witnesses:
WILLIAM WILES,
W. H. FUNHUT.